United States Patent Office 3,066,663
Patented Dec. 4, 1962

3,066,663
THERMAL INSULATED COMBUSTION
CHAMBERS
Thomas P. Rudy, Orinda, Calif., assignor to Shell Oil
Company, New York, N.Y., a corporation of Delaware
No Drawing. Filed Dec. 18, 1961, Ser. No. 160,306
5 Claims. (Cl. 123—191)

This invention relates to new and useful improvements in spark ignition internal combustion engines and more particularly to improved spark ignition internal combustion engines having high compression ratios.

It is generally accepted that the efficiency of an internal combustion engine can be improved by increasing the compression ratio. This relationship of high compression ratio to increased efficiency is fundamental in the development of more efficient engines having good performance characteristics. While the efficiency of the spark ignition internal combustion engine can thus be increased, in practice it has been found that a serious limitation is imposed by combustion chamber deposits which accumulate in high compression engines. Engine malfunctioning due to these combustion chamber deposits results in certain abnormal combustion chamber phenomena at compression ratios of about 8.5:1 and higher. A particularly troublesome combustion phenomenon, commonly referred to as "rumble," is a result of surface ignition. Today rumble looms as a formidable barrier to the design of efficient engines with high compression ratios.

Rumble is a low frequency engine vibration set up by an unduly rapid rise in combustion chamber pressure and is characterized by a low pitched rapping noise in the range of approximately 600 to 1200 cycles per second. Generally, rumble is a very loud, harsh noise and in severe cases might be compared to the noise from loose connecting rod bearings. It is most likely to occur at high engine speeds and loads such as may be encountered in passing or hill climbing. Rumble is objectionable not only because it poses a barrier to higher compression ratios and higher engine efficiency, but also it is the product of an abnormal combustion process which cannot be controlled without resorting to methods such as the following: (a) use of special fuels, e.g., highly paraffinic gasoline, (b) periodic mechanical or chemical treatment of the combustion chamber to remove deposits, and (c) operation of the engine at reduced speed or reduced power output. Moreover, the incidence and severity of rumble increase as compression ratio increases, thereby suggesting that rumble is a function of higher temperatures and pressures which result from increased compression ratio. Other factors contributing to rumble include: highly aromatic fuel, high speeds and particularly the presence of more than one point of ignition or flame front, i.e., the occurrence of surface ignition.

It is known that, in gasolines containing organo-metallic antiknock additives such as tetraethyllead (e.g. "leaded" gasoline), phosphorus fuel additives are highly effective in reducing the tendency of combustion chamber deposits therefrom to ignite the fuel-air mixture (surface ignition). Phosphorus provides excellent control of surface ignition by converting certain metal compounds (residues from combustion of the organo-metallic antiknock agents) to phosphates, which have a markedly reduced tendency to catalyze the combustion of carbonaceous residues, and it has generally been found that phosphorus fuel additives will reduce rumble tendencies in high compression engines. Nevertheless, rumble often occurs in the very high compression engines which are appearing in the newer automobiles, even when these engines are operated on gasoline containing a phosphorus additive.

It is therefore an object of the present invention to extend the effectiveness of phosphorus fuel additives in high compression ratio, spark ignition, internal combustion engines. It is a further object to provide a novel, more efficient, high compression spark ignition internal combustion engine which can be operated with gasoline fuels containing an organo-metallic antiknock additive and a phosphorus compound and/or lubricating oils containing a phosphorus compound. Another object is to provide a novel spark ignition engine combustion chamber for use with lubricating oils containing a phosphorus compound and/or with leaded gasoline containing a phosphorus compound. Another object is to provide a novel method of operating a spark ignition internal combustion engine. A still further object is to provide internal combustion engines with increased compression ratios which are not limited by abnormal combustion phenomena. Other objects will be apparent hereinafter.

It has been disclosed in copending application Serial No. 79,539, filed December 30, 1960, now Patent No. 3,019,277 that rumble is uniquely related to certain deposits on combustion chamber surfaces. It has also been disclosed and claimed in the above-referenced application that by applying a controlled thermal insulation as herein defined to certain combustion chamber components, surface ignition phenomena, including rumble, can be controlled, and that a combustion chamber so coated will substantially eliminate rumble or at least minimize surface ignition to such an extent that rumble no longer is a material consideration in engine operations, when the engine is operated on fuels containing organo-metallic antiknock additives and phosphorus additives.

As disclosed in copending case Serial No. 79,539, when the metal surfaces of various combustion chamber components are coated with an insulator of appropriate thickness and thermal conductivity, the formation of highly ignitable lower deposit layers is avoided when phosphorus is used in the gasoline and/or the lubricating oil. The deposits which do form correspond essentially in composition and properties to the upper deposits conventionally accumulated in an untreated combustion chamber in the presence of phosphorus. That is, it was discovered that, by using an insulating material having certain thermal conductivity properties, the lower harmful deposits usually formed in a combustion chamber in effect are eliminated leaving only deposits which are rendered innocuous by the addition of phosphorus.

It has now been discovered that by polishing these various thermally insulated combustion chamber surfaces, a further and unexpected reduction in rumble over that of an unpolished thermally insulated surface is produced while simultaneously reducing the equilibrium octane requirement of the engine thus treated. That is, the instant invention is an improvement of the invention disclosed and claimed in copending case Serial No. 79,539, wherein a further unexpected reduction of rumble is achieved by means of polishing the surface of the thermal insulating material.

A series of tests conducted in a 10.6:1 compression ratio, laboratory engine demonstrated the effect of polishing surfaces of internal combustion engines treated with various insulating materials. The engine used in these tests was a single cylinder adaptation of a modern V-8 automotive engine with cast wedge combustion chamber configuration. The base lubricant for these experiments was a commercial ash-free SAE 10W–30 oil. The fuel consisted of 65% v. catalytic reformate and 35% v. catalytically cracked gasoline and had a Research Octane Number of about 100 at 3.18 grams of lead per gallon as TEL (as Motor Mix). The fuel contained 0.3 theory of tricresyl phosphate. The engine test cycle is given in Table I and results of these tests are set forth in Table II.

TABLE I
*Engine Cycle*

| Condition | Time, sec. | Air/Fuel Ratio | Air Consumption, lb./hr. | Spark Advance, °BTC | R.p.m. | Indicated Mean Effective Pressure, p.s.i. |
|---|---|---|---|---|---|---|
| Idle | 50 | 8.6 | 7 | 37 | 1,775 | 17 |
| Cruise | 70 | 12.0 | 30 | 37 | 1,820 | 80 |
| Full Throttle (every half hour) | 30 | 11.5 | 80 | 15 | 1,870 | 158 |

Mixture temperature was controlled at 125° F. and water jacket temperature at 155° F.

The single cylinder engines used in tests 2 and 3 of Table II below were treated as follows: That part of the cylinder head exposed to the combustion chamber (hereinafter referred to simply as cylinder head), the piston crown and the intake valve head were coated with a layer of zirconium oxide (12 to 14 mils thick). In addition, these coated surfaces were polished for test 3. The base test was performed with an uncoated combustion chamber; the base fuel and lubricating oil as described above were used in all three tests. The results are set forth below in Table II.

TABLE II

| Test No. | Insulation of Combustion Chamber | Compression Ratio | Test Duration (equivalent miles) | Average Rumble Rate at Conclusion of Test [a] (counts per hour) | Octane Requirement Initial | Octane Requirement Final | Octane Requirement Increase |
|---|---|---|---|---|---|---|---|
| 1 | None | 10.6:1 | 8,000 | 63 | 93.5 | 97.5 | 4 |
| 2 | $ZrO_2$ (12–14 mils) (unpolished) | 10.6:1 | 8,000 | 16 | 97.5 | 99.5 | 2 |
| 3 | $ZrO_2$ (12–14 mils) (polished) [b] | 10.6:1 | 8,000 | 4 | 96.5 | 99 | 2.5 |

[a] Cylinder pressure was sensed by a piezoelectric transducer. The resulting pressure-time signal was differentiated electronically to give a signal proportional to the rate of pressure change $(dP/dt)$. An amplitude discriminator recorded the number of combustion cycles in which the maximum rate of pressure increase exceeded 140% of that obtaining in a normal combustion cycle at full throttle. Rumble rate is expressed as the average number of cycles per hour with $dP/dt$ greater than 140% of normal.

[b] $ZrO_2$ surface polished manually with a wet abrasive to a finish smooth to the touch. That is, the surface after polishing was essentially free from irregularities thereon such as the small protrusions and indentions which normally are present after the insulated surface is applied to the combustion chamber surface.

It is apparent from the results set forth in Table II above that both treated surfaces (polished and unpolished) produced significant reductions in rumble with respect to the untreated engine as indicated by the average rumble rate at the conclusion of the 8000 equivalent mile tests. That is, the engines with unpolished and polished thermal insulated surfaces had an average rumble rate at the conclusion of the test of about 16 to 4 counts per hour, respectively, whereas the untreated engine had a rumble rate of about 63 counts per hour. Unexpectedly, however, the average rumble rate of the polished, treated engine was reduced to 4 counts per hour which is a fourfold reduction over that of the unpolished surface and a 16-fold reduction over that of the untreated engine. Therefore, it is concluded that by polishing the thermal insulating surfaces of the treated engine (whereby the surface is essentially free from irregularities thereon), rumble can be virtually eliminated.

Further, it is noted that insulating the various combustion chamber components results in a small but immediate increase in octane requirement, i.e., the initial ONR of the clean uncoated engine was 93.5 whereas the ONR of the clean treated (unpolished) engine was 97.5 and the ONR of the clean treated engine which was polished was 96.5. At first glance this marked increase in octane requirement of either treated engine would loom as a significant deterrent to correcting rumble phenomena by means of insulating various combustion chamber components. Moreover, improved cooling of the combustion chamber to control octane requirement is fundamental in modern engine design. Deliberate insulation would appear inconsistent with this principle. However, quite unexpectedly, it was discovered that with equilibrium combustion chamber deposits, the octane requirement of the uncoated engine increased to 97.5 (an ORI of 4), whereas the equilibrium octane requirement of the treated engine unpolished was 99.5 (an ORI of 2). However, the polished treated engine had an equilibrium octane requirement of 99 (an ORI of 2.5). Thus the polished surface showed a reduction in equilibrium octane requirement of 0.5 over that of the unpolished surface. It should be noted that the cited octane requirements are true spark knock requirements and that in the case of the uncoated engine the surface ignition limited octane requirement was frequently greatly in excess of 97.5. Furthermore, the improved rumble performance was gained without sacrifice of power output, that is, the full throttle indicated mean effective pressure at the conclusion of all three tests was essentially the same. Such benefit, however, can be obtained only if the thermal conductance of the coating is controlled carefully to fall within a very special range.

The thermal conductance of the insulating coatings of this invention are from about 130 B.t.u./hr./sq. ft./° F. to about 5000 B.t.u./hr./sq. ft./° F. For example, a 12 mil coating of zirconium oxide, having a thermal conductivity of 7 B.t.u./hr./sq. ft./° F./in., has a thermal conductance of about 580 B.t.u./hr./sq. ft./° F. In a preferred embodiment of the invention the insulating coating has a thermal conductance from about 500 to about 1000 B.t.u./hr./sq. ft./° F.

Various conventional methods of applying the controlled thermal insulation to the combustion chamber components can be employed. The insulating material of the invention is an inert coating of low thermal conductivity, preferably a ceramic type material with high resistance to thermal shock. While thermal conductance is a necessary criterion, the thickness used is important by itself too. Thickness of the coating should be from about 0.5 to about 20 mils and preferably 5 to 15 mils, with the optimum thickness within this range being determined by engine design and the thermal conductivity of the particular coating material employed. The coating materials encompassed by this invention display cohesive and adhesive properties sufficient to avoid fracturing or peeling during engine operation. In general, the coating preferably also has the following additional properties and characteristics:

A. High melting point
B. High hardness
C. Relatively inert chemically
D. Good mechanical strength
E. High corrosion resistance
F. Low coefficient of thermal expansion, and
G. Low thermal conductivity
H. Free from irregularities (polished to a smooth finish)

A wide variety of refractory type oxide coatings can be employed. For example, the oxides of zirconium and chromium display the requisite insulating properties. In addition, oxides of titanium, cerium and manganese and certain phosphates, silicates, fluorosilicates, and oxyhalides of these materials can also be employed with the thermal conductance limitations set forth above.

A conventional method of applying these coatings is a flame spraying type operation, wherein the coating material is melted in a flame gun and sprayed on the surface to be coated.

Any conventional method of polishing the coated surfaces can be employed provided that the thus-polished surface is smooth to the touch and is essentially free from the irregularities which usually are present after the thermal insulating barrier has been applied to the combustion chamber surfaces. These irregularities of the unpolished surfaces are often described as "hills" and "valleys" and usually cannot be avoided during application of the material to the combustion chamber surfaces by means of flame spraying processes and the like. It is preferred that the polished surface be essentially free from these irregularities. However, minor irregularities such as small cavities on the surface can be tolerated and often cannot be avoided when ceramic type materials are used. Polishing means such as abrasive type materials used alone or in combination with a wetting material can be employed. Various power type polishing equipment can also be used.

It was found that finely ground zirconium oxide has no significant effect on the ignition temperature of deposit samples taken from an uncoated engine, thereby showing that catalytic activity is not a necessary property of the insulating coating. Moreover, the thermal insulating coatings of the invention do not affect the cycle temperatures except at very early stages of deposit formation. Further, the cycle temperatures of the engine are virtually unchanged relative to an untreated engine at equilibrium deposit conditions. In addition, the coating does not affect engine lubrication or the equilibrium volumetric efficiency of the engine.

Depending upon the engine design and the thermal conductivity of the material employed as a coating, the various combustion chamber components, namely the cylinder head, intake valve and piston crown, could be coated at varying thicknesses and subsequently polished in whole or in part to obtain optimum results. For example, in a single-cylinder laboratory engine, it is preferred that the thickness at the periphery of the piston crown be approximately 8 mils whereas the thickness of the coating at the center of the crown can be approximately 6 mils. With the head and intake valve having about an 8 mil coating, the exhaust valve can tolerate coatings in the 1 to 2 mil range. However, a preferred embodiment is to have the exhaust valve uncoated. In a further preferred embodiment of the invention, the various combustion chamber components are coated and polished prior to their assemblage in the engine. To obtain the benefits of the invention, it is necessary that at least a substantial proportion of the total surface of the combustion chamber which is coated be polished; preferably at least about 25%, and more especially at least about 50%, of the coated surface should be polished. It is particularly preferred that from at least about 85% to about 100% of the combustion chamber which is coated be polished.

At equilibrium deposit conditions, the thermal behavior of the herein-defined combustion chamber is indistinguishable from that of an untreated engine. The present invention does not avoid altogether combustion chamber deposits, rather it tolerates certain types of deposits while avoiding the formation of others so as to eliminate rumble in high-compression engines without significantly increasing octane requirement at deposit equilibrium and without requiring special fuels, periodic mechanical and chemical treatment of the combustion chamber or sacrifice of power output. Moreover, if the particular high-compression engine has an octane requirement which is surface-ignition limited, a marked reduction in octane requirement can be obtained.

The present invention is operative in all spark ignition internal combustion engines including 4-cycle and 2-cycle engines. Moreover, the thermal insulation concept is equally effective in air-cooled and water-cooled systems. The various components which are coated are made of the conventional metals used in internal combustion engines, i.e., aluminum, steel, cast iron and the like.

The phosphorus can be introduced into the combustion chamber as a constituent of the gasoline, as a volatile constituent of the crankcase lubricating oil or as a constituent of both the gasoline and the lubricating oil. The phosphorus concentration in gasolines containing organometallic antiknock additives can range from about .00002% to about .03% by weight.

When introduced as an additive in a gasoline containing an organo-lead antiknock agent, the phosphorus can be present in concentrations from about 0.01 to about 2.0 theories and preferably between about 0.05 and about 0.5 theory. A particularly desirable composition contains about 0.3 theory of the phosphorus compound. A theory of phosphorus is defined as the amount of phosphorus theoretically required to react with the lead to form lead orthophosphate, namely two atoms of phosphorus for every three atoms of lead. Thus one theory of phosphorus denotes a phosphorus-to-lead atom ratio of 2:3. Therefore, the foregoing range of from about 0.05 to 0.5 theory of phosphorus corresponds to a phosphorus-to-lead atom ratio of from about 0.1:3 to 1:3.

Various volatile phosphorus compounds such as dimethyl xylyl phosphate can be employed as the additive in crankcase lubricating oils in concentrations from about .001 to about 0.2% w. phosphorus. It is preferred for the purposes of this invention that the phosphorus compound contain at least 1% w. phosphorus and preferably at least about 5% w. phosphorus.

Various mineral oils in the lubricating oil range boiling from 350 to 800° F. and having a viscosity of from about 40 SUS at 100° F. to about 110 SUS at 210° F. can be employed. A preferred oil is a mineral oil containing only non-ash-forming additives.

The following are a few examples of suitable phosphorus compounds which can be used in the practice of the present invention: tri(alkaryl) phosphorus compounds such as tri-(2,5 dimethylphenyl) phosphate (Bame et al., U.S. 2,889,212, June 2, 1959), dimethyl aryl phosphates such as dimethyl xylyl phosphate (Orloff et al., U.S. 2,948,599, August 9, 1960), diaryl phosphoramidates such as dixylyl phosphoramidate (Larson, U.S. 2,948,600, August, 9, 1960); other phosphorus compounds such as disclosed in Orloff et al., U.S. 2,929,833, March 22, 1960; DeWitt, U.S. 2,862,801, December 2, 1958; Orloff et al., U.S. 2,870,186, January 20, 1959; Kolka, U.S. 2,866,808, December 30, 1958; Orloff et al., U.S. 2,911,431, November 3, 1959, can also be used according to this invention.

According to the present invention, spark ignition internal combustion engines having compression ratios of up to about 14:1 can be efficiently operated without the advent of rumble. Since the rumble problem begins to be quite serious at compression ratios upward of 9:1, the engines of the invention having at least such compression ratios are especially beneficial. Moreover, since the various surface ignition phenomena can be controlled by the present invention, the total antiknock quality available in a fuel can be utilized for efficiency improvement e.g. by spark advance) because the octane reserve formerly necessary to combat noise resulting from surface ignition is no longer needed.

It is to be understood that any leaded gasoline fuel or any gasoline fuel containing organo-metallic antiknock additives can be utilized within the present invention. The term "leaded gasoline" is defined as a petroleum fraction boiling in the gasoline hydrocarbon range (between about 50° F. and about 450° F.) to which has been added a small amount, usually between about 0.05 and about 6.0 grams of metal per gallon, in the form of an organo-metallic antiknock agent, usually a lower alkyl antiknock composition such as tetraalkyllead, e.g., tetramethyllead, tetraethyllead, methyl triethyl lead, dimethyl diethyl lead, trimethyl ethyl lead, and various mixtures thereof. In addition to the lower alkyl lead primary antiknock additive, the gasoline can contain other organo-metallic compounds as supplemental antiknock agents. These include cyclopentadienyl nickel nitrosyl, methyl cyclopentadienyl manganese tricarbonyl, and tris-(acetylacetonate) iron-III, nickel 2-hexylsalicylate, bis-(N-butyl salicylaldimine) nickel and vanadium acetylacetonate.

The invention can be used with commercial gasoline products of conventional refinery processes, i.e., catalytic cracking, catalytic reforming, alkylation and thermal cracking. Straight run gasoline from the distillation of crude oil may also be used as one of the components.

In addition to the antiknock agents, the gasoline fuel can contain scavenger compositions such as ethylene dibromide and ethylene dichloride; it may also contain corrosion inhibitors and stabilizers, such as 2,4-dimethyl-6-tertiary butyl phenol, 2,6-di-tert-butyl-4-methylphenol, and other alkyl phenols, N,N'-di-sec-butyl-p-phenylenediamine, hydroquinone, phenyl-alpha-naphthylamine, N-butyl-p-aminophenol, alpha-naphthol and the like. Moreover, the gasoline fuel composition can also contain other organic materials such as tertiary butyl acetate and various deposit modifiers.

The following are illustrative examples of the invention showing the use of specific motor gasoline fuel composition, lubricating oil composition and coating compositions according to the invention.

EXAMPLE I

A catalytic reformate containing 0.2 g. of lead/gal. as tetramethyllead and 0.1 theory of phosphorus as methyl dixylyl phosphate and a non-ash mineral lubricating oil having a viscosity of about 40 SUS at 100° F. containing 0.001% w. phosphorus as dimethyl xylyl phosphate are used in a spark ignition internal combustion engine having a compression ratio of 11:1 wherein the cylinder heads, piston crowns, and intake valve heads of the said engine are coated with an 8 mil thickness of zirconium oxide ($ZrO_2$), said coatings comprising at least about 85% of the combustion chamber and wherein said coating is polished so that the surface thereof is essentially free from irregularities.

EXAMPLE II

A hydrocarbon fuel mixture consisting of 60% v. straight run gasoline and 40% v. aromatics and containing 2 grams of lead in a mixture comprising the following relative weight proportions:

| | Percent w. |
|---|---|
| Tetramethyllead | 0.3 |
| Trimethyl ethyl lead | 4.3 |
| Dimethyl diethyl lead | 4.3 |
| Methyl triethyl lead | 42.2 |
| Tetraethyllead | 33.0 |

(the remainder of the mixture consisting essentially of scavenger stabilizers and the like) and a mineral lubricating oil having a viscosity of 110 SUS at 210° F. containing 0.05% w. phosphorus as dimethyl xylyl phosphate are used in a spark ignition internal combustion engine having a compression ratio of 9:1, the piston crowns of which are coated with 12 mils of chromium oxide ($Cr_2O_3$), said coating comprising at least 50% of the combustion chamber wherein said coating is polished so that it is essentially free from irregularities.

EXAMPLE III

A hydrocarbon fuel comprising 50% v. catalytically cracked gasoline ($C_5$ to 250° F.), 25% v. straight run gasoline and 25% v. catalytic reformate containing 1 gram of lead/gal. in the following mixture:

| | Percent w. |
|---|---|
| Tetramethyllead | 30.0 |
| Trimethyl ethyl lead | 42.2 |
| Dimethyl diethyl lead | 22.2 |
| Methyl triethyl lead | 5.2 |
| Tetraethyllead | 0.5 | and containing 1.0 theory of tributyl phosphate and a non-ash mineral oil SAE 10W-30 are used in a spark ignition internal combustion engine, wherein the piston crown is coated with 15 mils of cerium oxide ($CeO_2$) and the coating is subsequently polished to remove essentially all the irregularities therefrom.

EXAMPLE IV

A gasoline consisting essentially of 60% v. catalytic reformate, 35% v. catalytically cracked gasoline and 5% v. butanes containing 3.1 grams of lead/gal. as TEL and 0.3 theory of phosphorus as cresyl diphenyl phosphate and a mineral lubricating oil SAE 20 are used in a spark ignition internal combustion engine having a compression ratio of 9:1 wherein said cylinder heads, piston crowns and intake valves are coated with 6 mils of manganese oxide ($Mn_3O_4$) and said coating is subsequently polished with a wet abrasive material to remove the major irregularities from the surface thereof.

EXAMPLE V

A catalytic reformate containing 1.0 gram lead as tetramethyllead and 1.0 theory phosphorus as tri[p-(n-propyl)phenyl] phosphite and a mineral lubricating oil SAE 10W-30 are used in a spark ignition internal combustion engine having a compression ratio of 10:1 wherein the cylinder heads are coated with 6 mils of zirconium oxide ($ZrO_2$) and subsequently polished.

EXAMPLE VI

A catalytic reformate containing 3 grams of lead as TEL and a non-ash mineral lubricating oil SAE 10W-30 containing 0.05% w. phosphorus as dimethyl cresyl phosphate are used in a spark ignition internal combustion engine having a compression ratio of 9.5:1 wherein the intake valve heads of said engine are coated with 4 mils of zirconium ortho-silicate ($ZrSiO_4$) and subsequently polished.

I claim as my invention:

1. A spark ignition, internal combustion engine for use with a gasoline fuel and crankcase lubricating oil at least one of which contains a phosphorus compound, said engine having a piston crown, intake valve and cylinder head a substantial proportion of the surfaces of which is exposed to combustion is coated with a thermal insulating material having a thermal conductance of from about 130 B.t.u./hr./sq. ft./° F. to about 5000 B.t.u./hr./sq. ft./° F., said coating being smooth and essentially free from irregularities.

2. A method of preventing rumble in a spark ignition internal combustion engine having a cylinder head, piston crown and intake valve comprising (1) coating a substantial proportion of the surfaces of the cylinder head, piston crown and intake valve exposed to combustion with a thermal insulating material having a thermal conductance of from about 130 B.t.u./hr./sq. ft./° F. to about 5000 B.t.u./hr./sq. ft.° F., (2) polishing said coated surfaces so that they are essentially free from irregularities, and (3) operating said engine with gasoline and lubricating oil at least one of which gasoline and lubricating oil contains a phophorus compound in a concentration sufficient to convert any combustion chamber deposits therein to form having reduced tendency to catalyze combustion of carbonaceous residue.

3. In the operation of a spark ignition internal combustion engine using a gasoline containing an organo-lead antiknock agent whereby carbonaceous deposits normally accumulate on the piston crown, cylinder head and intake valve to an extent causing surface ignition and rumble, the improvement comprising inhibiting surface ignition and rumble by effecting combustion in the presence of (1) a piston crown, cylinder head and intake valve a substantial proportion of the surfaces of which exposed to combustion is coated with a thermal insulating coating having a thermal conductance from about 130 B.t.u./hr./sq. ft./° F. to about 5000 B.t.u./hr./sq. ft./° F., said coated surfaces having a smooth finish and being essentially free from irregularities, (2) a quantity of phosphorus equivalent to from about 0.01 to about 2.0 theories based on the quantity of lead in the gasoline consumed therein.

4. A spark ignition, internal combustion engine for use with a gasoline fuel and a crankcase lubricating oil at least one of which contains a phosphorus compound, said engine having a substantial portion of the surfaces of the piston crown, intake valve, and cylinder head exposed to combustion, coated with a zirconium oxide insulating material having a thermal conductivity of about 7 B.t.u/hr./sq. ft./° F./inch in a thickness from about 0.5 mil to about 20 mils and said surfaces being smooth and essentially free from irregularities.

5. A spark ignition, internal combustion engine for use with a gasoline fuel and a crankcase lubricating oil at least one of which contains a phosphorus compound, said engine having a substantial portion of those surfaces of the piston crown, intake valve and cylinder head exposed to combustion coated with a ceramic insulating material having a thermal conductance from about 500 to about 1000 B.t.u./hr./sq. ft./° F. and ceramic coating being polished to a smooth finish and being essentially free from irregularities.

References Cited in the file of this patent

UNITED STATES PATENTS

| | | |
|---|---|---|
| 1,559,439 | Kapraun | Oct. 27, 1925 |
| 2,833,264 | Dailey et al. | May 6, 1958 |
| 2,873,733 | Hicks | Feb. 17, 1959 |
| 2,926,649 | Hicks | Mar. 1, 1960 |
| 3,019,277 | Rudy | Jan. 30, 1962 |